Figure 1:
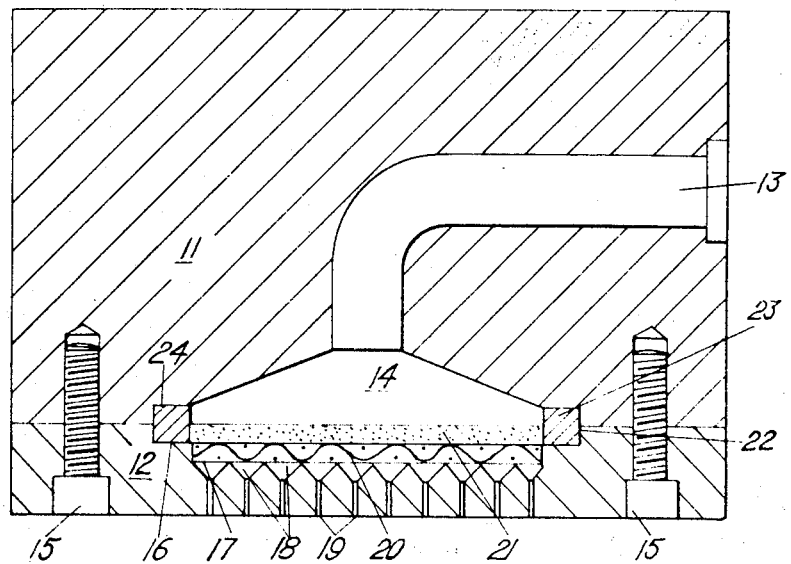

United States Patent [19]
Coates

[11] 3,768,661
[45] Oct. 30, 1973

[54] FILTER SEAL

[75] Inventor: Ronald Bell Coates, Harrogate, England

[73] Assignee: Imperial Chemical Industries Limited, London, England

[22] Filed: Dec. 28, 1970

[21] Appl. No.: 101,538

[30] Foreign Application Priority Data
Jan. 28, 1970  Great Britain ................... 4,152/70

[52] U.S. Cl. ................... 210/449, 210/474, 425/198
[51] Int. Cl. ................................................. D01d 3/00
[58] Field of Search ................... 18/85 F, 85 M; 29/522; 277/26; 425/198; 210/449, 474

[56] References Cited
UNITED STATES PATENTS

| | | | |
|---|---|---|---|
| 3,295,161 | 1/1967 | Mott | 18/85 F |
| 3,600,045 | 8/1971 | Inoue | 277/26 X |
| 3,149,845 | 9/1964 | Knox | 277/26 |
| 2,803,851 | 8/1957 | Baunlich et al. | 18/85 F |
| 3,015,504 | 1/1962 | Fulton et al. | 277/26 |
| 2,971,219 | 2/1961 | Hill | 18/85 F |
| 3,479,692 | 11/1969 | Van Den Biggelaar | 425/198 X |
| 3,570,059 | 3/1971 | Mott | 425/198 X |

*Primary Examiner*—Samih N. Zaharna
*Assistant Examiner*—F. F. Calvetti
*Attorney*—Cushman, Darby & Cushman

[57] ABSTRACT

A sintered metal filter plate in, for example, a melt extrusion apparatus is sealed to its supporting structure by means of a ring of material surrounding the edge of the plate and fitted into an annular space defined between the plate and the supporting structure, the ring having a greater thermal coefficient of expansion than the supporting structure and being constructed of, for example, aluminum or polytetrafluroethylene.

15 Claims, 2 Drawing Figures

PATENTED OCT 30 1973 3,768,661

INVENTOR
RONALD BELL COATES
BY Cushman, Darby & Cushman
ATTORNEY

3,768,661

FILTER SEAL

The present invention relates to an improved method of controlling the flow pattern in the filtration of a liquid at elevated temperature and to apparatus therefor.

According to the present invention we provide an apparatus for the filtration of a liquid at elevated temperature including a filter of sintered particles through which said liquid is forced, said filter having a feed surface, a discharge surface and an edging extending between said feed surface and said discharge surface, said filter being restrained from movement in the direction of flow of said liquid by contact over a portion of said discharge surface with restraining means allowing passage of said liquid, said liquid being constrained to flow only through said filter, but through the whole area of said feed surface of said filter, in virtue of the proximity of rigid surrounding means forming an annular space between said filter and said rigid surrounding means and in virtue of said annular space being entirely occupied by a continuous body of material of melting point in excess of the temperature of that of the liquid, of thermal coefficient of expansion in excess of that of the material of said surrounding means and of plasticity sufficient at the temperature of said liquid to allow the conformation of the surface of said continuous body to irregularities of contacting surfaces towards which the material of said continuous body of material is urged with production of good sealing and yet not sufficiently plastic to allow significant flow through the pores of the filter.

According to the present invention we also provide a method of forming a pressure tight seal at an elevated temperature between a filter of sintered particles and a rigid surrounding wall spaced from said filter so as to leave an annular gap, wherein on assembly a preformed body of material of melting point in excess of the working temperature of said filter, of thermal coefficient of expansion in excess of that of the material of said surrounding wall and of plasticity sufficient at the working temperature to allow the conformation of the surface of said body of material to irregularities of contacting surfaces towards which it is urged with production of good sealing and yet not sufficiently plastic at the working temperature to allow significant flow through the pores of said filter, and of size and shape substantially to occupy the whole of the volume of said annular gap, is inserted into said annular gap and thereafter the filter assembly is raised to the working temperature.

The sintered particles of the filter may, for example, be of stainless steel, cupro-nickel or bronze. The filter may be arranged to have coarser pores at the feed surface and finer pores at the discharge surface. The filter may conveniently be of uniform thickness so as to allow uniform flow per unit area, and therefore uniform residence time throughout the filter. The filter may conveniently be supported on a stainless steel gauze which in turn is supported over the whole of its area on the rigid body of the apparatus in the vicinity of holes leading from the body of the apparatus. The filter is preferably rounded, for example circular or oval and of uniform thickness throughout. More than one filter may be sealed according to the method of our invention, if desired using a common body of material for sealing, so that liquid to be filtered passes through the filters successively.

The continuous body of material may be preformed to be a close but easy fit around the filter and within the surrounding means when the various parts of the apparatus are at ambient temperature. In view of the differential expansion on raising to the operating temperature, the continuous body of material will increase in volume by an amount greater than the increase in volume of the annular space, with consequent formation of a tight seal between the filter and the surrounding means; excess volume of the continuous body of material over that required completely to fill the annular space will be accomodated by plastic flow around the filter and in view of this, the dimensions of the continuous body of material should preferably be chosen to minimise this excess volume. Moreover, in cases wherein the differential expansion is minimal, the excess volume must be minimal. In view of the limited plasticity of the material of the continuous body of material, there will be no significant penetration of the pores of the filter, and further flow due to the urging produced by the pressure differential between the entry side of the filter and the exit side will not occur. Suitable materials for the continuous body of material are, for example, aluminium or poly(tetrafluroethylene). In the case of the use of aluminium for the continuous body of material, it will, of course, be necessary to employ as the material of the rigid surrounding means a metal of thermal coefficient of expansion smaller than that of aluminium, for example stainless steel, iron, bronze or copper. In the case of the use of polytetrafluoroethylene for the continuous body of material, in view of its high thermal coefficient of expansion any metal will be suitable to employ as the material of the rigid surrounding means, provided that its melting point is appropriately high and it is chemically inert to the liquid being filtered at the elevated temperature. We have found particularly good results using poly(tetrafluroethylene) as the material for the continuous body of material.

The apparatus of our invention is of particularly utility in the melt extrusion of thermoplastic polymers in the formation of shaped articles, for example fibres, films and moulded articles since such thermoplastic polymers are commonly sensitive to thermal treatment with resultant change in properties, for example of viscosity or colour, and it is important in the case of such polymers to minimise variation of residence time of the various parts of the liquid. Since in the apparatus of our invention there is no gasketting in contact with the feed surface or the discharge face of the filter all fluid flow through the filter is approximately normal to the feed surface. Thus, with a uniform thickness throughout the filter, uniform residence time of the liquid is obtained, and no stagnant zones are produced. By an elevated temperature we mean a temperature sufficiently higher than that at which assembly takes place to produce the desired differential expansion. In the case of melt extrusion of thermoplastic polymer, an elevated temperature will be a temperature above about 150° C.

A specific exemplification of the apparatus of our invention will now be described with particular reference to FIG. 1 in which is shown a vertical section of an apparatus according to our invention.

Figure 2:
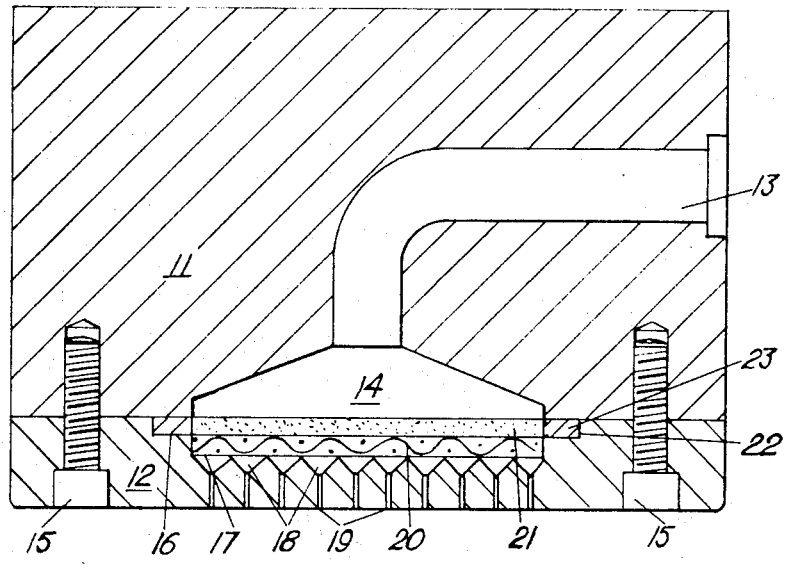

FIG. 2 shows a vertical section of alternative apparatus according to our invention. The same numbers are used to indicate similarly named parts.

Referring to FIG. 1, the apparatus consists of a rigid body of stainless steel consisting of an upper part (11)

and a lower part (12). The upper part (11) has liquid feed pipe (13) leading to flared portion (14). The lower part (12) is fixed to the upper part (11) by means of bolts (15). A depression (16), of diameter 4.564 inches and of depth 0.076 inches and concentric with the entry of the feed pipe (13) to the flared portion (14), is cut in the lower part (12), and a depression (24) of the same dimensions as depression (16) is cut in the upper part (11). A further depression (17), of diameter 4.300 inches and of depth 0.075 inches and concentric with the depression (16), is cut in the floor of the depression (16). The further depression (17) leads into a series of lead-in holes (18), and from each of these into a spinneret hole (19). A stainless steel gauze (20) forms a moderately close fit in the further depression (17). A sintered stainless steel filter (21) of diameter 4.313 inches and of thicknesses 0.079 inches sits on the gauze (20). An annular ring (23), of poly(tetrafluoroethylene), with an internal diameter of 4.319 inches and an outside diameter of 4.557 inches fits around the filter (21) and within the depressions (16 & 24) and is of height 0.165 inches.

In operation, the apparatus was assembled at 20° C, with the end faces of the poly(tetrafluoroethylene) annular ring (23) firmly compressed between the upper part (11) and lower part (12) of the rigid body, heated to a temperature of 290° C and fed with molten poly-(ethylene terephthalate) through the feed pipe (13) at a temperature of 290° C by means not shown and at a pressure of 1,400 pounds per square inch gauge. Observation showed that a good seal was obtained.

I claim:

1. An apparatus for the filtration of a liquid at elevated temperature including a filter of sintered particles through which said liquid is forced, said filter having a feed surface, a discharge surface and an edging extending between said feed surface and said discharge surface, rigid surrounding means spaced from and surrounding said edging, said filter being restrained from movement in the direction of flow of said liquid by contact over a proportion of said discharge surface with restraining means allowing passage of said liquid, said liquid being constrained to flow only through said filter, but through the whole area of said feed surface of said filter, in virtue of the proximity of said rigid surrounding means forming an annular space between said filter and said rigid surrounding means and in virtue of said annular space being entirely occupied by a continuous body of material of melting point in excess of the temperature of that of the liquid, of thermal coefficient of expansion in excess of that of the material of said surrounding means and of plasticity sufficient at the temperature of said liquid to allow the conformation of the surface of said continuous body to irregularities of contacting surfaces towards which the material of said continuous body of material is urged with production of good sealing and yet not sufficiently plastic to allow significant flow through the pores of the filter.

2. A method of forming a pressure tight seal at an elevated temperature between a filter of sintered particles and a rigid surrounding wall spaced from said filter so as to leave an annular gap, wherein on assembly a preformed body of material of melting point in excess of the working temperature of said filter, of thermal coefficient of expansion in excess of that of the material of said surrounding wall and of plasticity sufficient at the working temperature to allow the conformation of the surface of said body of material to irregularities of contacting surfaces towards which it is urged with production of good sealing and yet not sufficiently plastic at the working temperature to allow significant flow through the pores of said filter, and of size and shape substantially to occupy the whole of the volume of said annular gap, is inserted into said annular gap and thereafter the filter assembly is raised to the working temperature.

3. An apparatus according to claim 1 wherein said continuous body of material is polytetrafluoroethylene.

4. An apparatus according to claim 1 wherein said rigid surrounding means is of metal.

5. An apparatus according to claim 4 wherein the metal is selected from the group consisting of stainless steel, iron, bronze or copper.

6. An apparatus according to claim 1 wherein said continuous body of material is aluminium, and said rigid surrounding means is of a metal of thermal coefficient of expansion less than that of aluminium.

7. An apparatus according to claim 6 wherein said rigid surrounding means is selected from the group consisting of stainless steel, iron, bronze or copper.

8. An apparatus according to claim 1 wherein said filter is selected from the group consisting of stainless steel, cupra-nickel or bronze.

9. A method of forming a pressure tight seal according to claim 2 wherein said continuous body of material is polytetrafluoroethylene.

10. A method of forming a pressure tight seal according to claim 2 wherein said rigid surrounding means is of metal.

11. A method of forming a pressure tight seal according to claim 2 wherein said metal is selected from the group consisting of stainless steel, iron, bronze or copper.

12. A method of forming a pressure tight seal according to claim 2 wherein said continuous body of material is aluminium.

13. A method of forming a pressure tight seal according to claim 2 wherein said rigid surrounding means is selected from the group consisting of stainless steel, iron, bronze or copper.

14. A method of forming a pressure tight seal according to claim 2 wherein said filter is selected from the group consisting of stainless steel, cupronickel or bronze.

15. Apparatus for filtering a liquid at elevated temperature comprising: a filter of sintered particles having a feed surface, a discharge surface and an edge extending between the feed surface and the discharge surface; restraining means contacting a proportion of the discharge surface for restraining the filter from movement in the direction of flow of the liquid; rigid body means surrounding and spaced from the edge of the filter to define an annular space which is coextensive with said edge; an annular sealing member wholly occupying said annular space and having end faces compressed between corresponding surfaces on the body means, said sealing member being constructed of material of melting point in excess of the temperature of that of the liquid, of thermal coefficient of expansion in excess of that of the material of said body means and of plasticity sufficient at the temperature of said liquid to allow the conformation of the surface of said sealing member to irregularities of contacting surfaces towards which the material of said sealing member is urged with production of good sealing and yet not sufficiently plastic to allow significant flow through the pores of the filter.

* * * * *